United States Patent Office 3,301,062
Patented Jan. 31, 1967

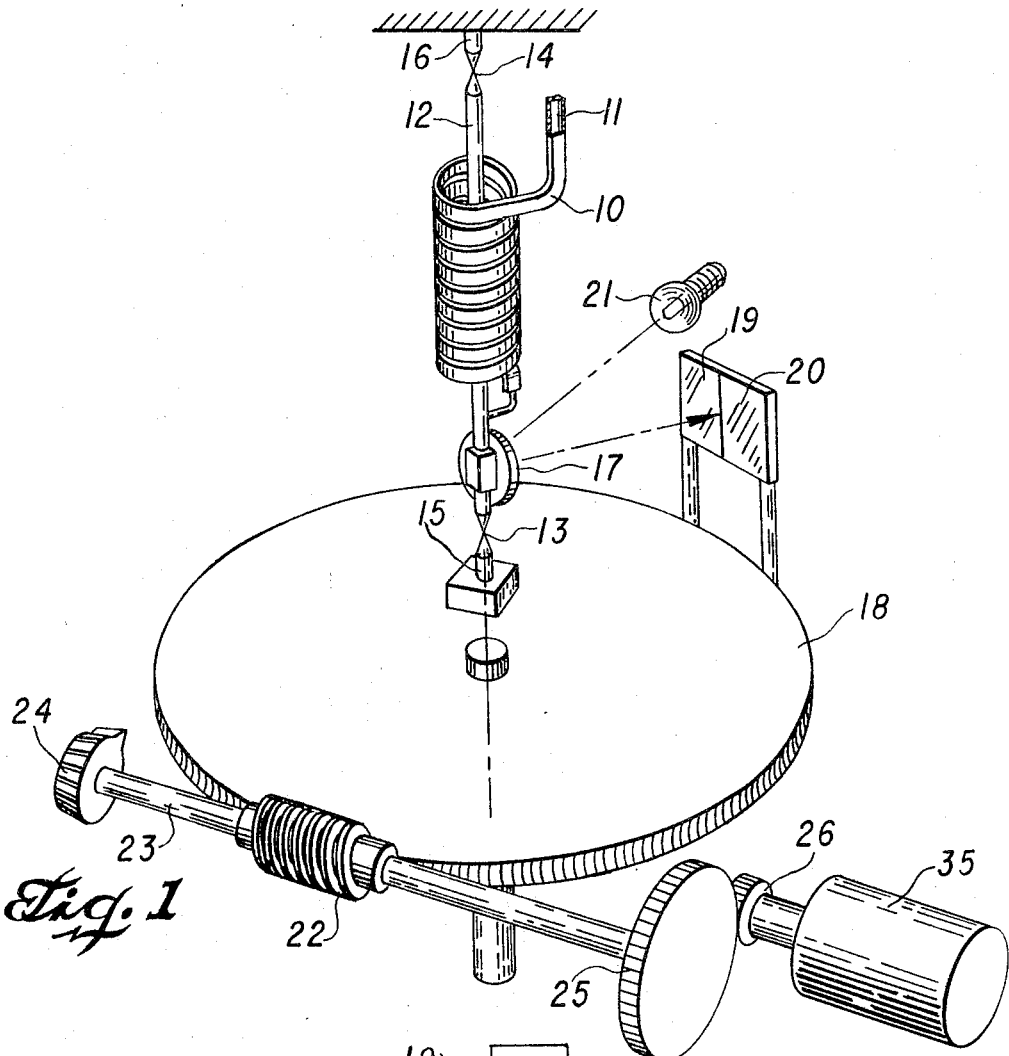

3,301,062
TEMPERATURE COMPENSATED PRESSURE
SENSITIVE DEVICE
Carl E. Reesby and John B. Damrel, Jr., Houston, Tex., assignors to Texas Instruments Incorporated, Dallas, Tex., a corporation of Delaware
Filed Mar. 16, 1966, Ser. No. 534,696
10 Claims. (Cl. 73—393)

This invention relates to a fused quartz Bourdon tube pressure device, and more particularly to such a device having means therein to compensate for errors in the operation of the device due to temperature change. The invention is in the nature of a novel improvement over the Bourdon tube pressure gauge shown in copending application, Serial No. 513,468, filed December 13, 1965, and assigned to the assignee of the present application.

In a fused quartz Bourdon tube pressure device of the type described in the referenced copending application, there is provided apparatus for measuring the displacement of the Bourdon tube in response to an applied pressure differential, which apparatus includes a photoelectric output circuit that generates a signal when the Bourdon tube is not in a predetermined spatial relationship with the measuring apparatus. The measuring apparatus may be moved into such predetermined relationship and thereby provide a measure of the tube displacement by the displacement of the measuring apparatus when the output signal is nulled. Alternatively, the measuring apparatus and the Bourdon tube may be left in the spatial arrangement produced by the displacement of the Bourdon tube, with the output signal being taken as an indication of the tube displacement. In either case, inaccuracies in pressure measurement may be introduced by a change in temperature, which produces a displacement of the Bourdon tube independent of the applied pressure and correspondingly changes the electrical output signal independent of pressure. Pressure measurements, which rely on the output signal, will indicate a change in pressure where the only change has been in temperature.

Therefore it is an object of the invention to provide a fused quartz Bourdon tube pressure device which produces an electrical output signal and includes a circuit to compensate for the effect of temperature change on the operation of the device.

It is another object of the invention to provide a fused quartz Bourdon tube pressure device that includes a circuit which generates a signal that modifies the electrical output signal of the pressure device in opposition to the modification of the signal produced by the displacement of the Bourdon tube in response to a change in temperature.

A feature of the invention is a temperature compensation circuit including a temperature sensitive impedance, such as a thermistor, to generate a signal for modifying the output signal of a fused quartz pressure device. The signal from the compensation circuit varies in opposition to the change produced in the output signal by a temperature variation, thereby compensating for the effects of temperature on the device.

Other objects, features and advantages of the invention will be more readily understood from the following detailed description when read in conjunction with the appended claims and attached drawing, in which:

FIGURE 1 illustrates a temperature compensated fused quartz Bourdon tube pressure device according to the invention.

FIGURE 2 is a schematic diagram of the circuit of the pressure device in FIGURE 1.

Referring now to the drawing, FIGURE 1 illustrates a pressure sensitive device providing temperature compensation according to the invention. The device is a pressure gauge, the central element of which is a hollow fused quartz Bourdon tube 10, sealed at one end and connected at the fixed open end 11 thereof to a source of pressure to be measured. A fused quartz rod 12 is mounted for rotation by quartz hinges 13 and 14 to fixed supports 15 and 16, respectively. Bourdon tube 10 is connected by the sealed end thereof to rod 12. Mounted on rod 12 is a mirror 17. The pressure external to the Bourdon tube 10 is a standard pressure, for example, atmospheric pressure. When the unknown pressure applied to the interior of Bourdon tube 10 is different from atmospheric pressure, thereby producing a pressure differential across the walls of the Bourdon tube, the sealed end of the tube 10 tends to deform about the helical axis thereof, open end 11 being fixed in position. Rod 12 and the mirror 17 attached thereto rotate with the deformation of the Bourdon tube 10. The deformation of tube 10 and the consequent rotation of mirror 17 may be made proportional to the pressure differential acting upon the Bourdon tube.

Turntable 18 is mounted for rotation about the helical axis of the Bourdon tube 10. Mounted in fixed relation to turntable 18 are solar cells 19 and 20 and light source 21. Turntable 18, having gear teeth about its periphery, is driven by the rotation of worm gear 22 and the latter is mounted on shaft 23 to be turned by means of graduated knob 24. When a pressure differential is applied to tube 10, mirror 17 is rotated. Turntable 18 is then rotated by means of knob 24 until the light emitted by lamp 21 and reflected from mirror 17 divides in a predetermined manner between cells 19 and 20. The existence of the predetermined distribution of the light is detected by the circuit shown in FIGURE 2, to be described hereinafter. The amount of rotation of turntable 18 necessary to produce the predetermined alignment of the reflected light with cells 19 and 20 is a measure of the rotation of mirror 17 and hence the displacement of Bourdon tube 10 in consequence of the pressure differential applied thereto. Since the displacement of the Bourdon tube is proportional to the applied pressure differential, the amount by which turntable 18 is rotated is a measure of the pressure differential. Accordingly, a readout of the rotation of turntable 18 may be calibrated in pressure units to indicate the pressure differential applied to Bourdon tube 10. This is done, of course, by applying a series of known pressure differentials to tube 10 and rotating turntable 18 to the null position as determined by the null meter 32 in the circuit of FIGURE 2 for each pressure differential applied. At each null position, there is noted the position of knob 24 corresponding to the known applied pressure differential.

In FIGURE 2 there is shown the electrical output circuit of the pressure gauge shown in FIGURE 1, including temperature compensation means in accordance with the invention. Solar cells 19 and 20 are connected in series conductive relationship with a variable resistor 30 connected therebetween. Cells 19 and 20 may be, for example, high efficiency solar cells of the type manufactured and sold by Hoffman Electronics Corporation, El Monte, California, catalog number 120 CG–11. In temperature compensation circuit 33, a battery 34 is connected across the terminals of a variable resistor 35. Resistor 35 is a multiturn potentiometer driven as shown in FIGURE 1 by shaft 23 through gears 25 and 26. Variable resistor 35 is of the conventional type wherein the change in resistance due to the rotation of the shaft thereof is proportional to the rotation of the shaft. Hence, changes in resistance produced by variable resistor 35 are proportional to the rotation of worm gear 22 and hence of turntable 18. Resistor 35 is set so that the wiper arm thereof is at ground potential when there is no pressure differential applied to Bourdon tube 10.

Connected in series with the wiper arm of resistor 35 are variable resistor 36 and thermistor 37. One terminal of said thermistor is connected to the null meter 32, the latter being connected to wiper arm 31 of resistor 30.

To illustrate the operation of the invention, there will first be described the operation of the circuit in FIGURE 2 without the temperature compensation circuit 33, that is, with thermistor 37 disconnected from the junction of wiper arm 31 and meter 32. In such an arrangement the signal at wiper arm 31 (the input terminal of meter 32) derives from the voltages generated by solar cells 19 and 20. Under the influence of the light beam reflected from mirror 17 (FIGURE 1), solar cell 19 produces a positive voltage which is applied to one terminal of variable resistor 30, and cell 20 applies a negative voltage to the other terminal of resistor 30. The voltage at wiper arm 31 is then some value between the positive voltage of cell 19 and the negative voltage of cell 20, the particular value depending upon the position of wiper arm 31. When pressure measurements are made, wiper arm 31 is left in a fixed position, and cells 19 and 20 are rotated with respect to the light beam until the particular voltages generated thereby produce a zero voltage at wiper arm 31. The existence of zero volts at wiper arm 31 is detected by null meter 32. At the null condition, the rotation of turntable 18 is determined by the rotation of knob 24 (as previously described), such rotation being taken as a measure of the displacement of Bourdon tube 10. It can be seen from the circuit of FIGURE 2 that the voltages of cells 19 and 20 giving rise to the null condition can be adjusted by the setting of wiper arm 31. Thus, in setting up the gauge for operation, wiper arm 31 may be set so that during pressure measurements the null condition arises when the voltage of cell 19 has the same magnitude as that of cell 20, corresponding to a condition in which there is approximately equal division of the radiation of the light beam between cell 19 and cell 20. It is also satisfactory to operate the gauge so that the null condition occurs when the light beam is substantially unequally divided between the cells. Such is the case because the rotation of the turntable 18 from one null position to another in response to a pressure change is the same, whatever the alignment between the light beam and solar cells at null, just as long as the cells and beam are aligned the same for each null position.

If a temperature change occurs while the circuit is nulled, the change causes the Bourdon tube 10 to be additionally displaced. The accompanying shift in the light beam reflected from mirror 17 causes the voltages produced by cells 19 and 20 to shift from the values which gave rise to the null condition. In the absence of temperature compensation, in order to renull the gauge, turntable 18 must be rotated to correspond to the additional displacement of Bourdon tube 10. Such rotation of turntable 18 indicates a change in pressure, when in fact the change has been in temperature rather than pressure.

When the compensation circuit 33 is employed as illustrated in FIGURE 2, the conditions for a null indication at meter 32 are changed even in the absence of temperature variations. That is, if the gauge without the compensation circuit 33 were nulled as previously described, the connection thereto of circuit 33 would destroy the null owing to the application of a positive potential to the meter 32 from battery 34, establishing a current through the meter to ground. In such a case, turntable 18 would have to be rotated to renull the meter 32. When the null circuit including compensation circuit 33 is at null, the positive potential at the wiper arm of variable resistor 35 causes a current to flow through resistors 36 and 37 toward wiper arm 31. Null meter 32 draws no current, since the potential at the input thereof is zero. Hence, the described current flows in the branch of resistor 30 connected to negative cell 20, and the current in this branch is then the sum of the described current and the current from the positive terminal of cell 19. The voltages from cells 19 and 20 which produce zero volts at arm 31 in the presence of such current are clearly different from those which produce zero volts at arm 31 in the absence of circuit 33, in which latter case the current through cell 20 is simply the current from cell 19.

Such a shift in the null condition due to the use of compensation circuit 33 would not be particularly important if the shift were a constant one for all angular displacements of turntable 18. However, since the voltage at the wiper arm of variable resistor 35 changes in proportion to the amount of rotation of turntable 18, the null point shift produced by compensation circuit 33 varies with rotation of turntable 18. As a result, with the use of the compensation circuit 33, the alignment of cells 19 and 20 with respect to the reflected light beam is different for a null at one pressure from the alignment of the cells and beam for a null at another pressure. Hence, a change in the angular displacement of Bourdon tube 10 does not result in precisely the same change in the angular displacement of turntable 18. Accordingly, the calibration of turntable 18, i.e., the calibration of knob 24, must be different from that used in the absence of compensation circuit 33. To accomplish the calibration, a succession of known pressures is applied to the gauge in a controlled, constant temperature environment and the degree of rotation of turntable 18 corresponding to the null position for each applied pressure is noted.

To illustrate the use of the temperature compensation provided by circuit 33, it may be assumed that the apparatus of FIGURES 1 and 2 is at null, with a pressure differential applied, when a temperature change occurs. Upon the changing of the temperature, Bourdon tube 10 undergoes a change of angular displacement. The magnitude of the displacement is directly proportional to the temperature change, and the constant of proportionality (the thermoelastic modulus) is proportional to the stress placed upon the tube. The stress is, in turn, directly proportional to the displacement of the tube from an unstressed condition, so that the change in displacement due to temperature is a linear function of temperature and of the total displacement of the tube. Furthermore, for small displacements from null, such as those produced by normal temperature variations, the increase in the voltage of one solar cell and the accompanying decrease in the voltage of the other cell are directly proportional to the displacement of Bourdon tube 10 from null. Thus, the increase and decrease in cell voltages due to a temperature change are linearly related to the amount of temperature change and the amount of total displacement of Bourdon tube 10. Such changes in voltages tend to produce a like change in the currents through resistor 30. However, the temperature coefficient of thermistor 37 may be selected so that the change in current produced by the temperature variation in the resistance thereof offsets the tendency for the current to change and thus maintains the null condition. For example, if the voltage of cell 19 decreases and the voltage of cell 20 increases, the voltage at wiper arm 31 tends to go negative and draw more current through thermistor 37. However, an increase in the resistance of thermistor 37 can reduce the current through this thermistor and maintain wiper arm 31 at zero volts. Thus, circuit 33 modifies the voltage at wiper arm 31 in opposition to the modification of the voltage produced by the displacement of Bourdon tube 10.

Thus, the temperature variation of thermistor 37 is selected in view of the voltage applied to resistor 35 so that for any given rotation of turntable 18, a change in temperature will change the resistance of thermistor 37 enough to restore the voltage at wiper arm 31 to null. While thermistor 37 fixes the change with temperature of the resistance between potentiometer 35 and meter 32, resistor 36 is adjustable to establish the value of such resistance at any given temperature. It is possible to make such a selection of thermistor 37 because for any given rotation of turntable 18, the effect of temperature on tube 10, and hence on cells 19 and 20, is linear, as is the effect on thermistor 37. To account for the different effect of temperature at different displacements of the Bourdon tube 10 and different rotations of turntable 18 the voltage provided by potentiometer resistor 35 is made to vary so that, as the meter 32 is nulled at various rotations of turntable 18, the compensating effect of thermistor 37 will change to accord with the change in the effect of temperature on tube 10 and hence on cells 19 and 20 from one position of turntable 18 to another.

It is to be understood that the above-described embodiment is merely illustrative of the application of the principles of the invention. Numerous other arrangements may be devised by those skilled in the art without departing from the spirit and scope of the invention as defined by the appended claims.

What is claimed is:
1. A fused quartz Bourdon tube pressure device, comprising:
   means for producing a first signal indicative of the displacement of said Bourdon tube is response to pressure applied thereto and
   compensation means for generating a second signal responsive to the displacement of said Bourdon tube caused by a change in ambient temperature, said compensation means including a temperature sensitive impedance means which causes said second signal to vary in response to an ambient temperature change, whereby said compensation means modifies said first signal in opposition to a modification of said first signal in response to the displacement of said Bourdon tube by said change in ambient temperature.
2. The device of claim 1, wherein said impedance means is an impedance which varies substantially linearly with temperature.
3. The device of claim 2, wherein said compensation means is a means for generating said second signal as a substantially linear function of the displacement of said Bourdon tube.
4. The device of claim 1, wherein said compensation means is a means for generating said second signal as a substantially linear function of the displacement of said Bourdon tube.
5. The device of claim 1, further including detector means for detecting a null condition at an input terminal thereof, said first and second signals each being applied to said input terminal.
6. The device of claim 1, wherein said compensation means generates said second signal at an output terminal thereof and includes a source of potential connected to said output terminal by said temperature sensitive impedance means.
7. The device of claim 6, wherein the resistance of said temperature sensitive resistor is linearly related to temperature.
8. The device of claim 6, wherein said source of potential includes means for varying said potential in proportion to the displacement of said Bourdon tube.
9. The device of claim 8, wherein said means for varying said potential includes a source of fixed potential with a potentiometer connected thereto, the variable element of said potentiometer being displaced in proportion to said Bourdon tube displacement.
10. A fused quartz Bourdon tube pressure device, comprising:
    a Bourdon tube,
    light-sensitive means responsive to the position of a light beam positioned by the displacement of said Bourdon tube for producing at an output terminal a signal proportional to said displacement,
    a potentiometer with a source of fixed potential connected thereto, the variable element of said potentiometer being displaced in proportion to said Bourdon tube displacement,
    a linearly temperature sensitive resistor connected between the variable tap of said potentiometer and said output terminal, and
    detector means connected to said output terminal for detecting a null thereat.

References Cited by the Examiner

UNITED STATES PATENTS

| | | | |
|---|---|---|---|
| 2,387,909 | 10/1945 | Inghan | 73—393 |
| 3,075,390 | 1/1963 | Sheppard | 73—393 |
| 3,111,848 | 11/1963 | Cornelison | 73—418 |

LOUIS R. PRINCE, *Primary Examiner.*

D. O. WOODIEL, *Assistant Examiner.*